US010578465B2

(12) United States Patent
Levy et al.

(10) Patent No.: US 10,578,465 B2
(45) Date of Patent: Mar. 3, 2020

(54) SENSOR BUS SYSTEM AND UNIT WITH INTERNAL EVENT VERIFICATION

(71) Applicant: Infineon Technologies AG, Neubiberg (DE)

(72) Inventors: David Levy, Wernberg (AT); Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 435 days.

(21) Appl. No.: 14/612,670

(22) Filed: Feb. 3, 2015

(65) Prior Publication Data
US 2016/0223370 A1    Aug. 4, 2016

(51) Int. Cl.
*G01D 18/00* (2006.01)
*B60R 21/01* (2006.01)

(52) U.S. Cl.
CPC ............ *G01D 18/00* (2013.01); *B60R 21/01* (2013.01); *B60R 2021/01027* (2013.01); *B60R 2021/01068* (2013.01)

(58) Field of Classification Search
CPC .................. G01D 18/00; B60R 21/01; B60R 2021/01068; B60R 2021/01027
See application file for complete search history.

(56) References Cited

U.S. PATENT DOCUMENTS

| | | | | |
|---|---|---|---|---|
| 5,268,668 A | * | 12/1993 | Berube | G08B 26/002 340/3.52 |
| 5,899,949 A | * | 5/1999 | Kincaid | B60R 21/01 180/268 |
| 6,108,616 A | | 8/2000 | Borchers et al. | |
| 6,466,539 B1 | * | 10/2002 | Kramer | G06F 11/0757 370/216 |
| 6,530,597 B1 | * | 3/2003 | Nesper | B60R 21/01 280/735 |
| 7,152,188 B1 | * | 12/2006 | Meyer-Grafe | H04L 12/40032 714/43 |
| 7,362,216 B2 | * | 4/2008 | Li | B60Q 9/006 340/431 |

(Continued)

FOREIGN PATENT DOCUMENTS

DE    19516938 C1    12/1996
DE    102008043683 A1    5/2010

*Primary Examiner* — Thomas G Black
*Assistant Examiner* — Sze-Hon Kong
(74) *Attorney, Agent, or Firm* — Eschweiler & Potashnik, LLC

(57) ABSTRACT

Internal event verification is enabled in sensor bus systems. One example sensor bus system includes a channel master component and one or more channel slave components. A first subset of the channel slave components can include sensors that sense one or more properties (e.g., acceleration) associated with an event (e.g., crash) and output sensor data based on the one or more sensed properties. A second subset of the channel slave components can include channel verification components that can receive, decode, and analyze at least a portion of the sensor data, and output event data indicating whether an event occurred based on the analyzed portion of the sensor data. The channel master component can receive and decode the sensor data and the event data, and output information to a controller, which can send a signal to initiate a response (e.g., airbag deployment) when an event is detected and verified.

20 Claims, 8 Drawing Sheets

(56) References Cited

U.S. PATENT DOCUMENTS

| | | | | |
|---|---|---|---|---|
| 7,450,006 | B1* | 11/2008 | Doyle | G08B 13/122 340/10.1 |
| 7,516,025 | B1* | 4/2009 | Williams | G05B 23/0278 702/182 |
| 7,869,889 | B2 | 1/2011 | Flanders | |
| 8,125,109 | B2 | 2/2012 | Dold | |
| 9,195,232 | B1* | 11/2015 | Egnor | G05D 1/0055 |
| 9,252,945 | B2 | 2/2016 | Lewis | |
| 9,381,882 | B2 | 7/2016 | Kim | |
| 10,088,818 | B1* | 10/2018 | Mathews | H04L 12/2825 |
| 2001/0013826 | A1* | 8/2001 | Ahmed | G01D 11/24 340/439 |
| 2001/0037170 | A1* | 11/2001 | Morell | B60R 21/013 701/45 |
| 2002/0030113 | A1* | 3/2002 | Abuzeid | G05D 27/02 236/4 |
| 2002/0116103 | A1* | 8/2002 | Matsunaga | G07C 5/008 701/32.7 |
| 2003/0139866 | A1* | 7/2003 | Frimberger | B60K 28/14 701/45 |
| 2005/0065711 | A1* | 3/2005 | Dahlgren | G07C 5/008 701/117 |
| 2006/0015231 | A1* | 1/2006 | Yoshimura | B60K 6/46 701/48 |
| 2006/0016260 | A1* | 1/2006 | Smith | G01P 21/00 73/504.03 |
| 2006/0076182 | A1* | 4/2006 | Kifuku | B62D 5/0481 180/446 |
| 2006/0126256 | A1* | 6/2006 | Forest | B60W 50/029 361/139 |
| 2007/0300293 | A1* | 12/2007 | Tsutsui | G06F 21/32 726/5 |
| 2010/0241317 | A1* | 9/2010 | Mihara | B60R 21/0132 701/46 |
| 2010/0250021 | A1* | 9/2010 | Cook | G07C 5/085 701/1 |
| 2010/0256946 | A1 | 10/2010 | Carresjo | |
| 2011/0089953 | A1* | 4/2011 | Chandler | B60L 50/64 324/427 |
| 2011/0187546 | A1* | 8/2011 | Liberman | B60R 21/0132 340/669 |
| 2012/0176239 | A1* | 7/2012 | Preden | H04Q 9/00 340/539.17 |
| 2012/0226965 | A1* | 9/2012 | Hammerschmidt | H03M 13/093 714/807 |
| 2012/0265471 | A1* | 10/2012 | Hess | G01D 3/036 702/88 |
| 2013/0253775 | A1* | 9/2013 | Shimizu | B60R 21/013 701/45 |
| 2013/0261941 | A1* | 10/2013 | Nishimura | F02N 11/0807 701/113 |
| 2014/0074315 | A1* | 3/2014 | Frye | G08G 1/0104 701/1 |
| 2014/0121891 | A1* | 5/2014 | Barrett | H04L 69/08 701/33.2 |
| 2014/0214281 | A1* | 7/2014 | Welker | F41H 11/00 701/45 |
| 2014/0257729 | A1* | 9/2014 | Wolf | G01D 4/004 702/89 |
| 2014/0282868 | A1* | 9/2014 | Sheller | G06F 21/31 726/3 |
| 2014/0306814 | A1* | 10/2014 | Ricci | H04W 4/21 340/425.5 |
| 2014/0324389 | A1* | 10/2014 | Baldwin | G01D 9/005 702/187 |
| 2014/0358377 | A1* | 12/2014 | Hammerschmidt | G06F 11/36 701/45 |
| 2015/0046710 | A1* | 2/2015 | Clish | H04L 9/3273 713/169 |
| 2015/0067176 | A1* | 3/2015 | Dubois | H04L 69/08 709/227 |
| 2015/0154136 | A1* | 6/2015 | Markovic | G06F 13/4022 710/317 |
| 2015/0223286 | A1* | 8/2015 | Linscott | G01F 1/00 702/45 |
| 2015/0230108 | A1* | 8/2015 | Sridhara | H04W 24/08 455/405 |
| 2015/0281430 | A1* | 10/2015 | Cho | H04M 1/72569 455/418 |
| 2016/0325767 | A1* | 11/2016 | LeFebvre | B61L 15/0027 |
| 2016/0352565 | A1* | 12/2016 | Dai | G05B 23/0297 |
| 2017/0041688 | A1* | 2/2017 | Pitigoi-Aron | H04Q 9/00 |
| 2017/0227614 | A1* | 8/2017 | Scherr | G01R 33/0023 |
| 2018/0042560 | A1* | 2/2018 | Mannheimer | G01D 18/00 |

* cited by examiner

SENSOR BUS SYSTEM AND UNIT WITH INTERNAL EVENT VERIFICATION

FIELD

The present disclosure relates to a sensor bus system and unit with internal event verification that can be employed additionally or alternatively to an event verifier external to the sensor bus system and unit.

BACKGROUND

In some situations, it is important to have a high degree of confidence in sensor results before action is undertaken based on the sensor results. One such example scenario is airbag deployment. To ensure airbags are only deployed where necessary (e.g., when a crash has actually occurred), a high degree of confidence in sensor results is required before airbag deployment. Inadvertent airbag deployment can cause injuries and/or accidents. Additionally, there are many other situations where a high degree of confidence in sensor results is beneficial, including a variety of situations associated with safety (e.g., involving risk of injury or death), etc.

To achieve a high degree of confidence in sensor results, redundancy can be added to sensor systems to ensure that if an event (e.g., crash, etc.) occurs, it is confirmed by multiple independent sources. Redundancy can be achieved through the following: two or more sensors can be located at the same point in the car but attached to different channels, such that each should indicate the event; an on-board sensor can be included on the electronic control unit (ECU) as a redundant sensor; and/or an event verification controller (EVC) that monitors sensor data in parallel to the controller can be included to independently determine whether an event has occurred based on the sensor data.

DETAILED DESCRIPTION

Figure 1:
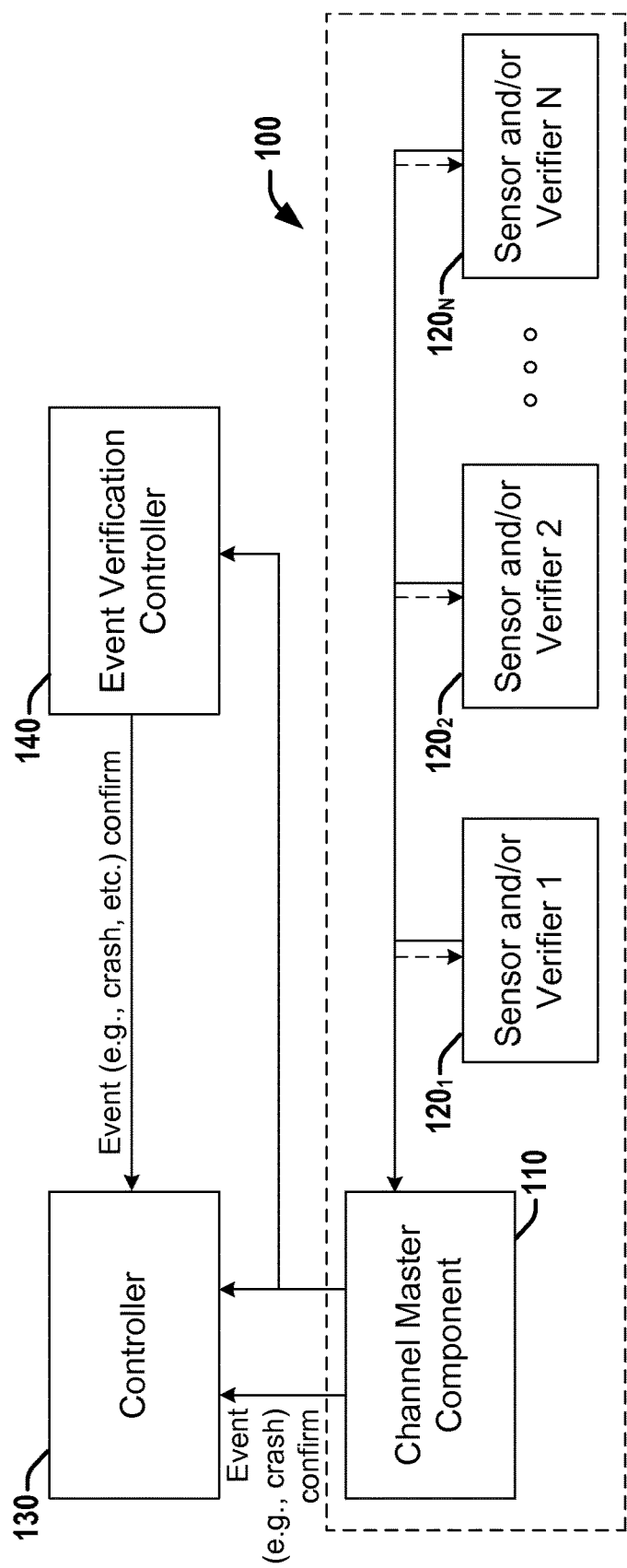
FIG. 1 is a block diagram illustrating a sensor bus system that provides for internal event verification according to various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Referring to FIG. 1, illustrated is a block diagram of a sensor bus system 100 that provides for internal event verification according to various aspects described herein. Sensor bus system 100 includes a channel master component 110 and one or more channel slave components 120$_i$, each of which can include a sensor, one or more types of channel verification components as described herein, or both. Channel master component 110 and the one or more channel slave components $120_i$ can be communicatively coupled to one another via a sensor bus, which can include hardware (e.g., wire, optical fiber, etc.) and/or software (e.g., communication protocol, etc.) that facilitates communication between channel master component 110 and the one or more channel slave components $120_i$. In contrast to conventional systems, in which channel slave components only include sensors, in embodiments described herein, the one or more channel slave components $120_i$ can include a set of one or more sensors, as well as a set of one or more channel verification components (each of which can be of any type described herein, such as a channel monitoring sensor $220_i$, a channel event verifier 322, a self-verifying sensor $420_i$, or combinations thereof, such as a sensor that is both self-verifying and channel monitoring, etc.). In aspects, both a sensor and a channel verification component can be included in the same channel slave component $120_i$ (e.g., as a channel monitoring sensor $220_i$, a self-verifying sensor $420_i$, etc.), or only one of the two can be (e.g., a conventional sensor, a channel event verifier 322, etc.). In various embodiments, sensor bus system 100 can include two or more sensors among the channel slave components $120_i$ (e.g., three, etc.), although it need not. Channel master component 110 is configured to couple to a controller 130 (e.g., micro-controller, etc.) and, in various embodiments, an event verification controller 140.

Each of the sensors among the one or more channel slave components $120_i$ is configured to sense or measure one or more properties (e.g., pressure at various locations, acceleration at various locations, etc.) associated with a possible event (e.g., vehicle crash, etc.) and to output sensor data based on the sensed or measured one or more properties (e.g., periodically, in accordance with the communication interface or protocol employed by the sensor bus system). In aspects, sensors discussed herein can include microelectromechanical systems (MEMS) sensors, such as a MEMS pressure sensor or MEMS accelerometer.

Channel master component 110 and channel slave components $120_i$ can communicate via any of a variety of communications protocols or interfaces, such as PSI5 (Peripheral Sensor Interface 5), DSI3 (Distributed System Interface 3), SENT (Single Edge Nibble Transmission) or the SPC (Short PWM (Pulse Width Modulation) Code), or other interfaces. An example of a communication interface is discussed in pending U.S. Patent Publication Number 2015/0012678, entitled "SENSOR SYSTEMS AND METHODS UTILIZING ADAPTIVELY SELECTED CARRIER FREQUENCIES," the entirety of which is hereby incorporated by reference. Channel master component 110 can communicate with controller 130 and/or event verification controller 140 via SPI (Serial Peripheral Interface) or a similar interface.

Channel master component 110 and channel slave components $120_i$ can be organized as a master/slave system. As such, channel master component 110 can receive data (sensor and/or event data) from the one or more channel slave components $120_i$, and optionally can provide to the channel slave components $120_i$ at least one of power, configuration information (e.g., initially, etc., including with threshold values where appropriate, as discussed herein), or control information. Control information can include information necessary for communication via an interface, such as a clock signal, carrier frequency(ies) selection, etc. Channel slave components $120_i$ can receive any power, control information, or configuration information provided by channel master component 110, and output sensor and/or event data. Conventional slave components (e.g., conventional sensors) ignore data output by other slave components on the same channel. However, in aspects discussed herein, one or more channel slave components $120_i$ can receive and analyze sensor data from the same or other channel slave components $120_j$, and can output event data based on the analysis.

In addition to providing greater confidence in sensor results and lowering the risk of event misdetection (e.g., leading to inadvertent airbag deployment, etc.), embodiments described herein can also reduce the time for event (e.g., crash) detection and response (e.g., airbag deployment). Consider an example sensor bus system without channel verification components as described herein. In this example system, when an event occurs, it is detected at one or more satellite sensors, and communicated to the channel master component 110 (e.g., via an interface such as PSI5), which then translates the sensor data (e.g., by receiving the sensor and/or event data, decoding the sensor and/or event data from a first interface or protocol format (e.g., PSI5), and encoding the sensor and/or event data for a second interface or protocol format (e.g., SPI)) and communicates that data to the controller 130 and the event verification controller 140. Both the controller 130 and the event verification controller 140 analyze the sensor data to determine whether the event (e.g., crash) occurred, and the event verification controller 140 sends confirmation that the event occurred to the controller 130. Only after controller 130 both determines itself that the event occurred and receives confirmation that the event occurred from event verification controller 140 does controller 130 send a signal for the airbag to be deployed.

In contrast, with one or more channel verification components as described herein, in addition to channel master component 110 receiving sensor data, it can also receive event data from the one or more channel verification components indicating whether the event has occurred. Channel master component 110 can then translate both the sensor data and the event data to send to the controller 130. The controller 130 can then send a signal for the airbag to be deployed. As controller 130 has already received confirmation of the event via the event data provided by channel master component 110, improved response time to the event, and better determination of when the event occurred is provided, which can also improve response effectiveness (e.g., an improved estimate of the exact time of a crash can provide for more effective airbag deployment, etc.). Optionally, greater confidence in sensor results can be obtained by also analyzing the sensor data at the controller 130 and optionally sending the sensor data to the event verification controller 140 and responding after the event is additionally confirmed by the event verification controller 140.

Figure 2:
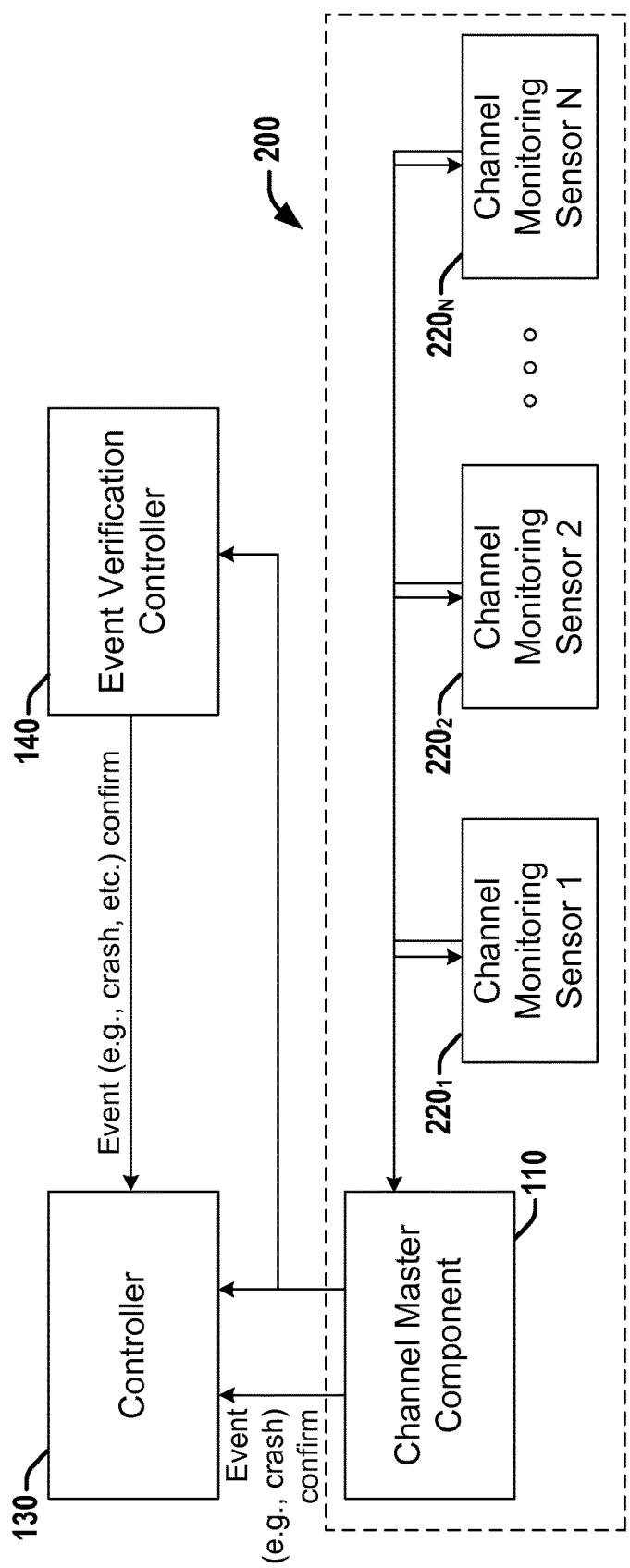
FIG. 2 is a block diagram illustrating a sensor bus system that provides for internal event verification via one or more channel monitoring sensors according to various aspects described herein.

Referring to FIG. 2, illustrated is a block diagram of a sensor bus system 200 that provides for internal event verification via one or more channel monitoring sensors $220_i$ according to various aspects described herein. In sensor bus system 200, one or more of the channel slave components $120_i$ can be a channel monitoring sensor $220_i$ that can monitor the data transmitted by other sensors on the same channel, regardless of whether those other sensors are conventional sensors or sensors with channel verification capabilities as described herein (e.g., other channel monitoring sensors $220_j$, self-verifying sensors $420_j$, combinations thereof, etc.).

The following example illustrates differences between sensor bus system 200 and a conventional system. In an example system with more than one sensor employing a time division duplexing (TDD) interface, the channel master controller 110 transmits a signal on a designated time slot (or in a designated frequency band, in a frequency division duplexing (FDD) embodiment), which each of the channel slave components listen to. On the next time slot (or in a next designated frequency band in FDD embodiments), the first channel slave component sends its data (e.g., sensor data in a conventional system, or sensor data and/or event data in aspects described herein). In a conventional system, the other channel slave components ignore the data sent from the first channel slave component. On the following time slot, the second channel slave component sends its data, etc., and the data from each sensor is ignored by other channel slave components in a conventional system. In contrast, however, in embodiments described herein, each channel monitoring sensor $220_i$ can receive the sensor data sent by other sensors on the channel, decode the sensor data, and analyze the sensor data to determine if an event occurred.

In embodiments employing communication interfaces that provide for bi-directional communication using the same method, such as SPC or that described in U.S. Patent Publication Number 2015/0012678, channel monitoring sensors $220_i$ can include logic to receive, decode, and analyze sensor data sent by other sensors on the same channel (e.g., by comparing to threshold values for determination of whether an event occurred, etc.). In embodiments wherein transmit and receive communications employ different modes, channel monitoring sensors $220_i$ can include similar logic, and can also include a receiver of the appropriate mode to receive sensor data from other sensors on the same channel (e.g., in a PSI5 interface, a channel monitoring sensor $220_i$ can include a current mode sensor to receive sensor data from other sensors on the same channel.). In some aspects, channel monitoring sensors $220_i$ can additionally include filters for filtering sensor data received at the channel monitoring sensor $220_i$, such as a low pass filter for noise rejection and/or a high-pass filter for DC removal.

During a system initialization and/or during runtime (e.g., periodically, etc.), channel master component 110 can initialize each of the channel monitoring sensors $220_i$, such as by transmitting to each channel monitoring sensor $220_i$ threshold values indicative of event occurrence for each other sensor of sensor bus system 200 (or a subset thereof). In embodiments with channel monitoring sensors $220_i$ including filters, additional configuration related to the filters can also occur during initialization. During runtime, each channel monitoring sensor $220_i$ can receive and decode sensor data transmitted by other sensors on the same channel. After decoding the sensor data, a channel monitoring sensor $220_i$ can analyze the decoded sensor data to check for message integrity of the sensor data and to determine whether a threshold associated with the sensor that transmitted the sensor data was crossed. Each channel monitoring sensor $220_i$ can transmit (in its time slots or frequency band) its own sensor data and event data associated with each monitored sensor, indicating whether an event associated with that sensor occurred, based on a comparison with the threshold value associated with that sensor. In one example embodiment, for each sensor monitored by a channel monitoring sensor $220_i$, the channel monitoring sensor $220_i$ can append two bits indicating whether the sensor data passed a message integrity check and whether the sensor data crossed a threshold value (e.g., indicating an event occurred). As only three values are needed (i.e., message integrity fail (e.g., 11), message integrity pass and threshold not crossed (e.g., 00), and message integrity pass and threshold crossed (e.g., 01), where example bit values are provided solely for the purpose of illustration, and alternative values can be used), receiving the fourth value (e.g., 10 in the example provided) from a channel monitoring sensor $220_i$ can be the basis for determining that there is an error associated with the channel monitoring sensor $220_i$ itself. In another example embodiment, a single bit can be appended for each monitored sensor, indicating only whether a threshold was crossed (in such embodiments, channel monitoring sensors $220_i$ need not check message integrity).

Figure 3:
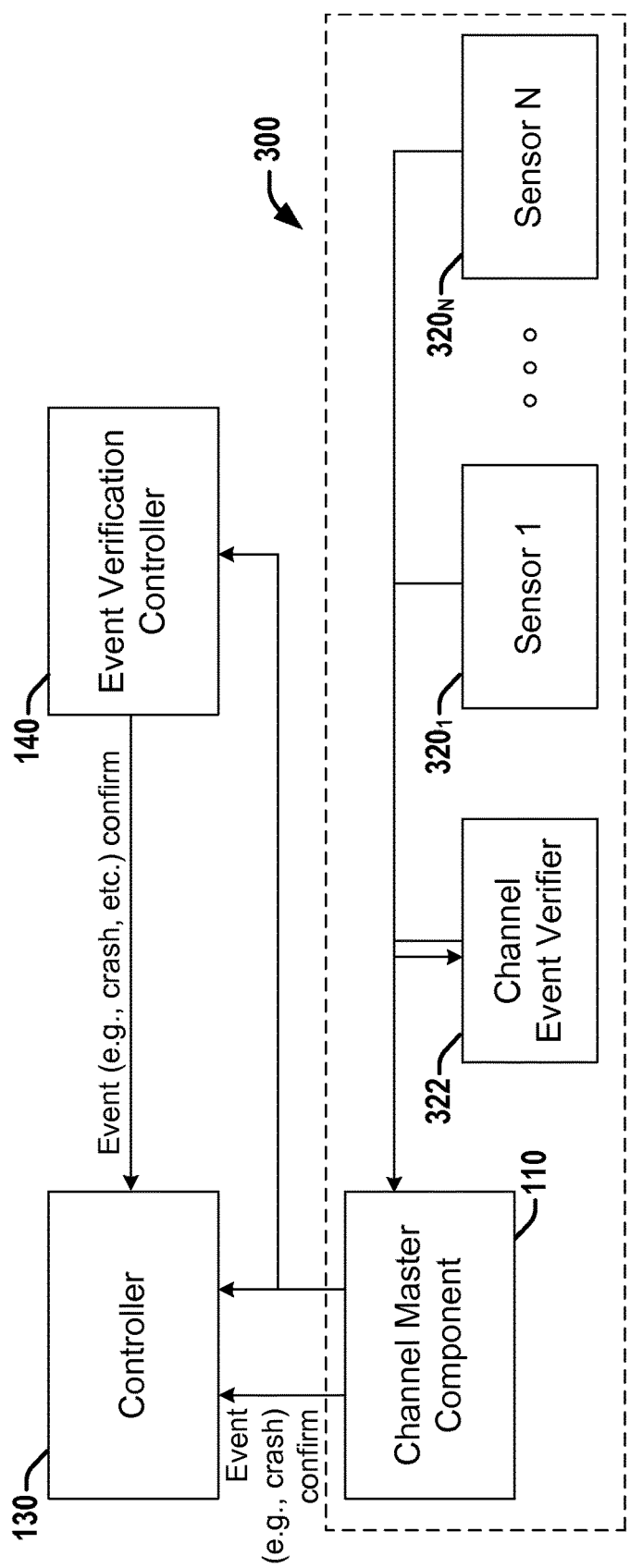
FIG. 3 is a block diagram illustrating a sensor bus system that provides for internal event verification via a channel event verification component according to various aspects described herein.

Referring to FIG. 3, illustrated is a block diagram of a sensor bus system 300 that provides for internal event verification via a channel event verifier 322 according to various aspects described herein. Sensor bus system 300 can also include one or more sensors $320_i$, which can be conventional sensors or any of a variety of sensors described herein (e.g., channel monitoring sensors, self-verifying sensors, combinations thereof, etc.). Channel event verifier 322 can be an event verification controller included specifically on a channel associated with sensor bus system 300. However, channel event verifier 322 employs a different communication interface than event verification controller 140, namely that of sensor bus system 300, but employing the same transmit mode as channel slave components of sensor bus system 300 (e.g., sensors $320_i$), and the same receive mode as the channel master component 110. Because channel event verifier 322 employs the same receive mode as channel master component 110, it can receive sensor data transmitted by sensors $320_i$ of sensor bus system 300. Channel event verifier 322 then analyzes the sensor data, and output event data for each monitored sensor $320_i$ indicating whether an event occurred. Because the output event data is transmitted in the same mode as the sensors $320_i$, channel master component 110 can receive this event data, translate it, and output the translated event data along with translated sensor data to the controller 130, and optionally to an event verification controller 140.

Figure 4:
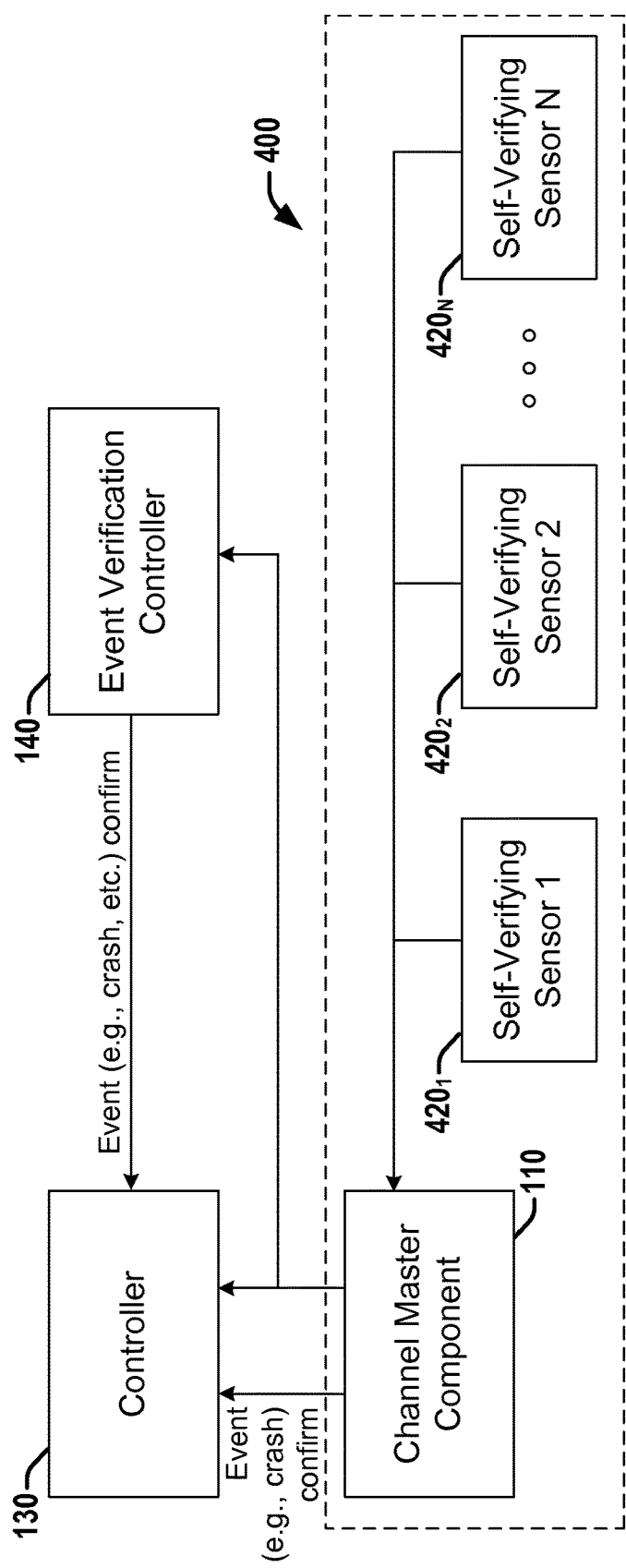
FIG. 4 is a block diagram illustrating a sensor bus system that provides for internal event verification via one or more self-verifying sensors according to various aspects described herein.

Referring to FIG. 4, illustrated is a block diagram of a sensor bus system 400 that provides for internal event verification via one or more self-verifying sensors $420_i$ according to various aspects described herein. In sensor bus system 400, one or more self-verifying sensors $420_i$ can be included, each of which can be configured to analyze sensor data that it collects to determine if an event occurred. As with channel monitoring sensors discussed in connection with FIG. 2, each self-verifying sensor $420_i$ can be initialized with threshold values to determine if an event occurred, which in this case is determined based on its own sensor data. In an example embodiment, each self-verifying sensor can transmit a single bit of event data along with its sensor data (e.g., appended to the sensor data or vice versa, etc.) indicating whether an event (e.g., crash) occurred (e.g., whether a threshold value was crossed, etc.). In some embodiments, to reduce the potential of a malfunction in a self-verifying sensor $420_i$ compromised both the sensor and channel verification component (i.e., the portions of self-verifying sensor $420_i$ that analyze sensor data to determine whether an event occurred) of the self-verifying sensor $420_i$, the hardware of self-verifying sensor $420_i$ can be configured to separate the sensor of self-verifying sensor $420_i$ from the channel verification component, thus reducing the likelihood of both being affected by a single malfunction.

Figure 5:
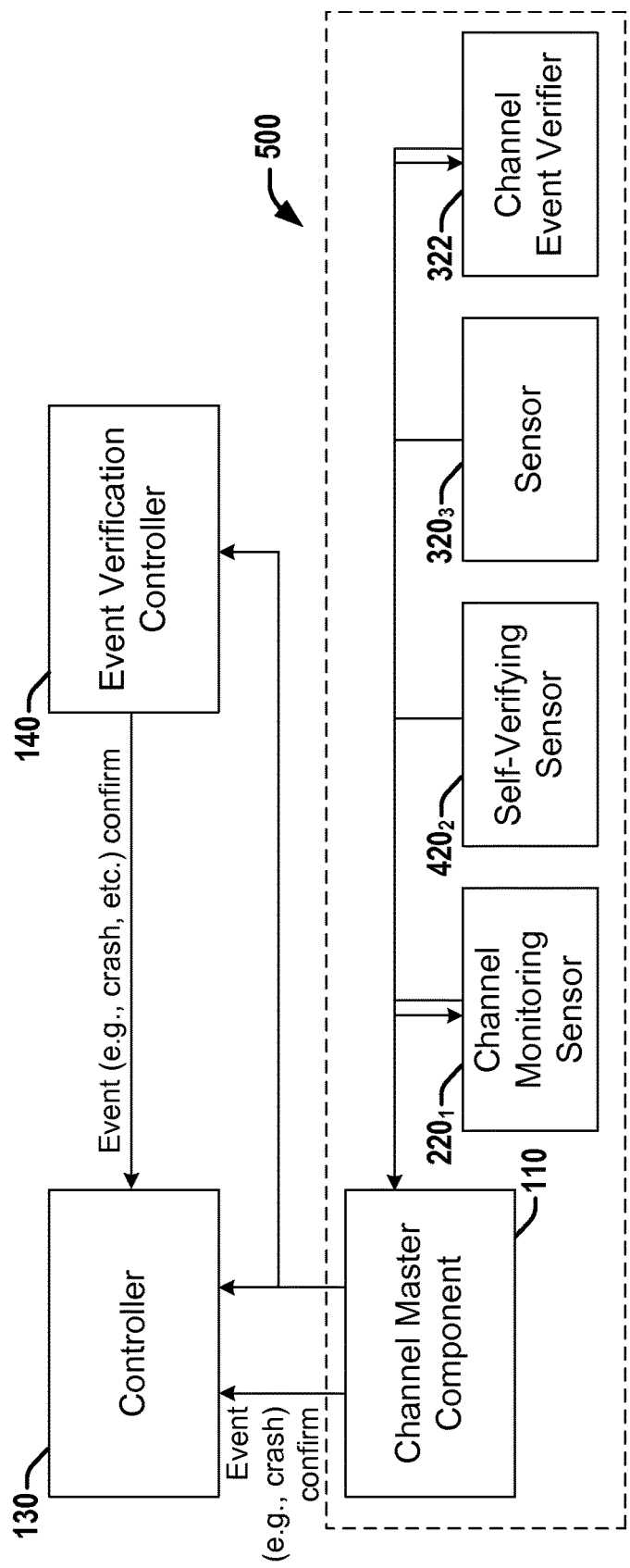
FIG. 5 is a block diagram illustrating a sensor bus system that provides for internal event verification via one or more types of channel verification components according to various aspects described herein.

Referring to FIG. 5, illustrated is a block diagram of a sensor bus system 500 that provides for internal event verification via one or more types of channel verification components $220_i$, 322, and/or $420_i$, according to various aspects described herein. Sensor bus system 500 shows an embodiment wherein each of the types of sensors and channel verification components discussed herein can be simultaneously employed. In the example embodiment of sensor bus system 500, each of channel monitoring sensor $220_1$, self-verifying sensor $420_2$, and sensor $320_3$ (which is, in this example embodiment, a conventional sensor, although other sensor types as described herein can be alternatively employed) collect sensor data by sensing one or more properties (e.g., acceleration) associated with an event (e.g., potential vehicle crash), and output their respective sensor data to the channel according to the communication interface (e.g., specifying timing, frequency, mode (e.g., voltage or current), etc.). Channel monitoring sensor $220_1$ also receives, decodes, and analyzes (e.g., by comparison to threshold values) sensor data from self-verifying sensor $420_2$ and conventional sensor $320_3$, and outputs event data associated with both self-verifying sensor $420_2$ and conventional sensor $320_3$ (e.g., appended to sensor data from channel monitoring sensor $220_1$ or vice versa, etc.) indicating whether an event occurred with neither, either, or both. Self-verifying sensor $420_2$ additionally analyzes its own sensor data (e.g., by comparison to a threshold value) and outputs event data indicating whether its own sensor data indicates that an event occurred. In addition, channel event verifier 322 receives, decodes, and analyzes sensor data from each of channel monitoring sensor $220_1$, self-verifying sensor $420_2$, and sensor $320_3$ to determine whether an event occurred based on the sensor data from one or more of these sensors (e.g., based on comparison to threshold values). Channel event verifier 322 then outputs event data indicating, for each of sensors $220_1$, $420_2$, and $320_3$, whether an event occurred. Thus, additional redundancy can be provided in-channel on the sensor bus system.

The data from sensor $220_1$ has had a single event detection made regarding its sensor data (via channel event verifier 322), but much more quickly than in conventional systems, as event detection occurred before the data has been translated and output to controller 130. The controller 130 can also analyze the sensor data and provide another layer of redundancy (as can event verification controller 140, which can provide a third event verification). For conventional sensor $320_3$, two event verifications can be provided in sensor bus system 500 (via channel monitoring sensor $220_1$ and channel event verifier 322), providing for multiple layers of redundancy and much earlier event detection than conventional systems, as event verification has occurred entirely in sensor bus system 500. For self-verifying sensor $420_2$, events have been verified by three sources in sensor bus system 500 (channel monitoring sensor $220_1$, self-verifying sensor $420_2$, and channel event verifier 322), providing both greater redundancy and faster event detection than conventional systems before the data is provided to controller 130. It is to be understood that the example sensor bus unit 500 is provided solely for the purpose of illustrating concepts discussed herein, and that in various embodiments, sensor bus units or systems can be provided with any selected degree of redundancy for sensor data.

Figure 6:
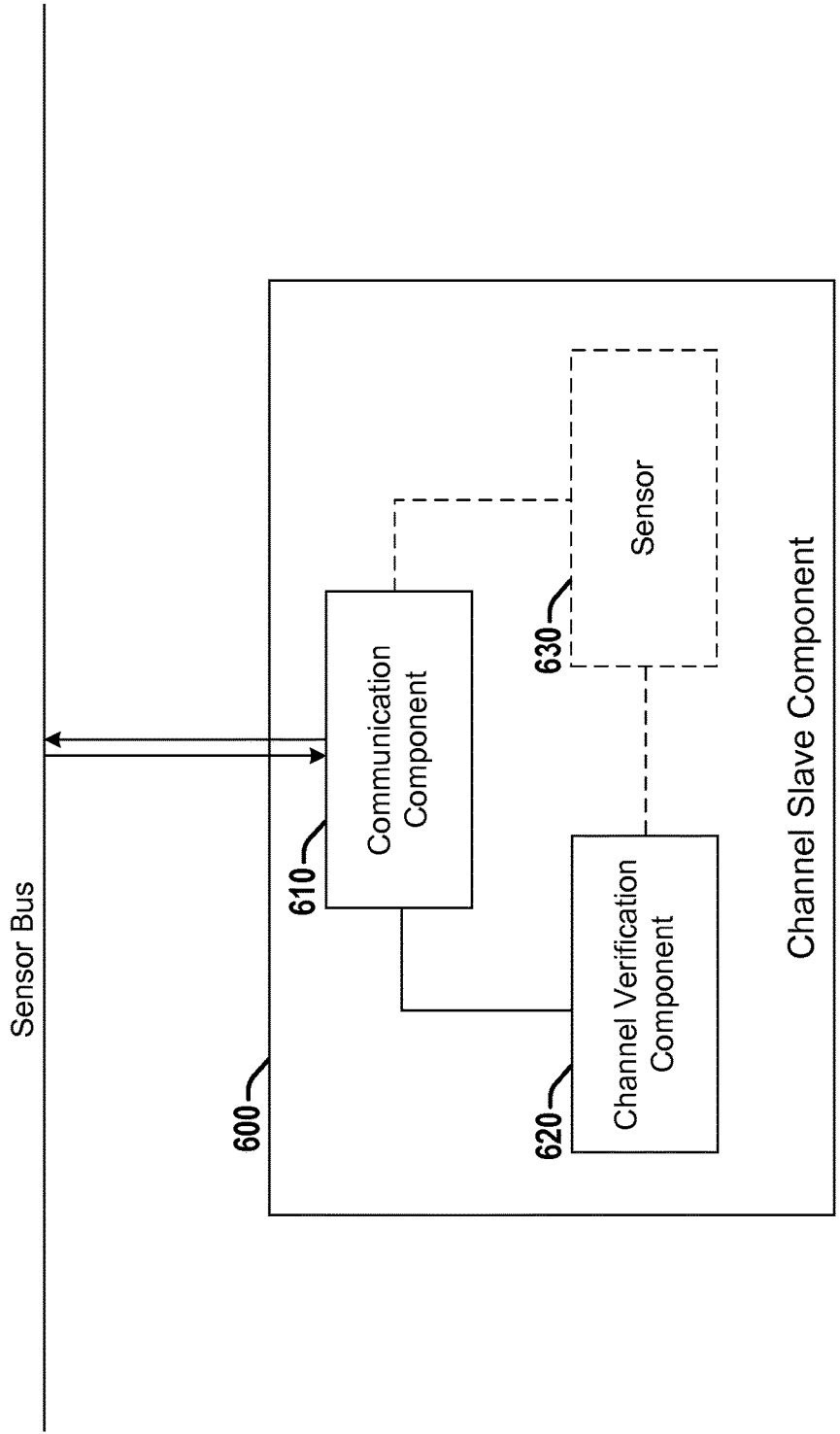
FIG. 6 is a block diagram illustrating a device that provides for internal event verification according to various aspects described herein.

Referring to FIG. 6, illustrated is a block diagram of a device 600 (e.g., channel slave component or sensor bus unit) that provides for internal event verification according to various aspects described herein. Device 600 includes a communication component 610 and a channel verification component 620. Optionally, device 600 also includes a sensor 630. In embodiments wherein device 600 does not include a sensor 630, device 600 can be a channel event verifier as described herein. In embodiments wherein device 600 does include sensor 630, device 600 can be a channel monitoring sensor, a self-verifying sensor, or a combination thereof, as described herein.

Communication component 610 is configured to couple to a sensor bus (e.g., such as those shown in FIGS. 1-5). Communication component 610 is configured to receive first sensor data (for analysis by channel verification component 620) and to transmit event data (from analysis by channel verification component 620) on a channel associated with the sensor bus. In various embodiments, communication component 610 is additionally configured to receive further information via the channel associated with the sensor bus. This further information can include control information (e.g., associated with a communication interface of the sensor bus) or configuration information (e.g., threshold values as discussed herein, etc.). Depending on the specific communication interface associated with the sensor bus, communication component 610 could be configured to transmit and receive via a common communication mode. Alternatively, for some communication interfaces, communication component 610 could be configured to transmit in a first communication mode, and to receive in a second, distinct, communication mode.

For clarity of discussion, sensor data analyzed by device 600 is referred to herein as first sensor data, and, in embodiments comprising a sensor 630, sensor data generated by sensor 630 is referred to as second sensor data. In various embodiments, the first sensor data and the second sensor data may be identical, overlapping, or distinct. For example, if device 600 is a self-verifying sensor but not a channel monitoring sensor, the first sensor data can be identical to the second sensor data. If device 600 is a channel monitoring sensor but not a self-verifying sensor, then the first sensor data and the second sensor data would be distinct. If device 600 is both a channel monitoring sensor and a self-verifying sensor, the first sensor data would include the second sensor data (and additional sensor data). The first sensor data (and the second sensor data, when device 600 includes sensor 630) can be associated with one or more first properties that can include any of a variety of properties. In embodiments associated with crash verification, the one or more first properties can include, for example, pressure(s) and/or acceleration(s) associated with one or more locations.

Channel verification component 620 can analyze at least a portion of the first sensor data. Based on the analysis, channel verification component 620 can generate event data that indicates whether an event (e.g., crash) occurred. This analysis can include, for example, comparing the first sensor data to one or more thresholds as described herein. This event data can then be transmitted by communication component 610 as described above.

When optional sensor 630 is included in device 600, sensor 630 can sense one or more second properties (e.g., pressure and/or acceleration associated with the location of device 600 or sensor 630) and generate second sensor data associated with the one or more second properties. Communication component 610 can receive the second sensor data and is configured to transmit the second sensor data to the channel associated with the sensor bus. The event data can be appended to the second sensor data, as described herein (or vice versa).

In self-verifying sensor embodiments (self-verifying only, or self-verifying and channel monitoring), channel verification component 620 can receive the second sensor data either from sensor 630 directly or from communication component 610. In such embodiments, the first sensor data includes the second sensor data, and can also be analyzed by the channel verification component 620. Thus, channel verification component 620 can generate the event data based at least in part on analysis of the second sensor data in such embodiments.

As discussed elsewhere herein, low pass and/or high pass filters can be employed for noise rejection and DC removal, respectively. One or both of these filters can be employed to filter the first sensor data to improve the accuracy of the analysis and generation of event data by channel verification component 620. In various embodiments, one or both of these filters can be included in communication component 610 (e.g., on a receive chain, to filter the first sensor data, as opposed to the event data or second sensor data). In the same or other embodiments, one or both of these filters can be included in channel verification component 620.

Figure 7:
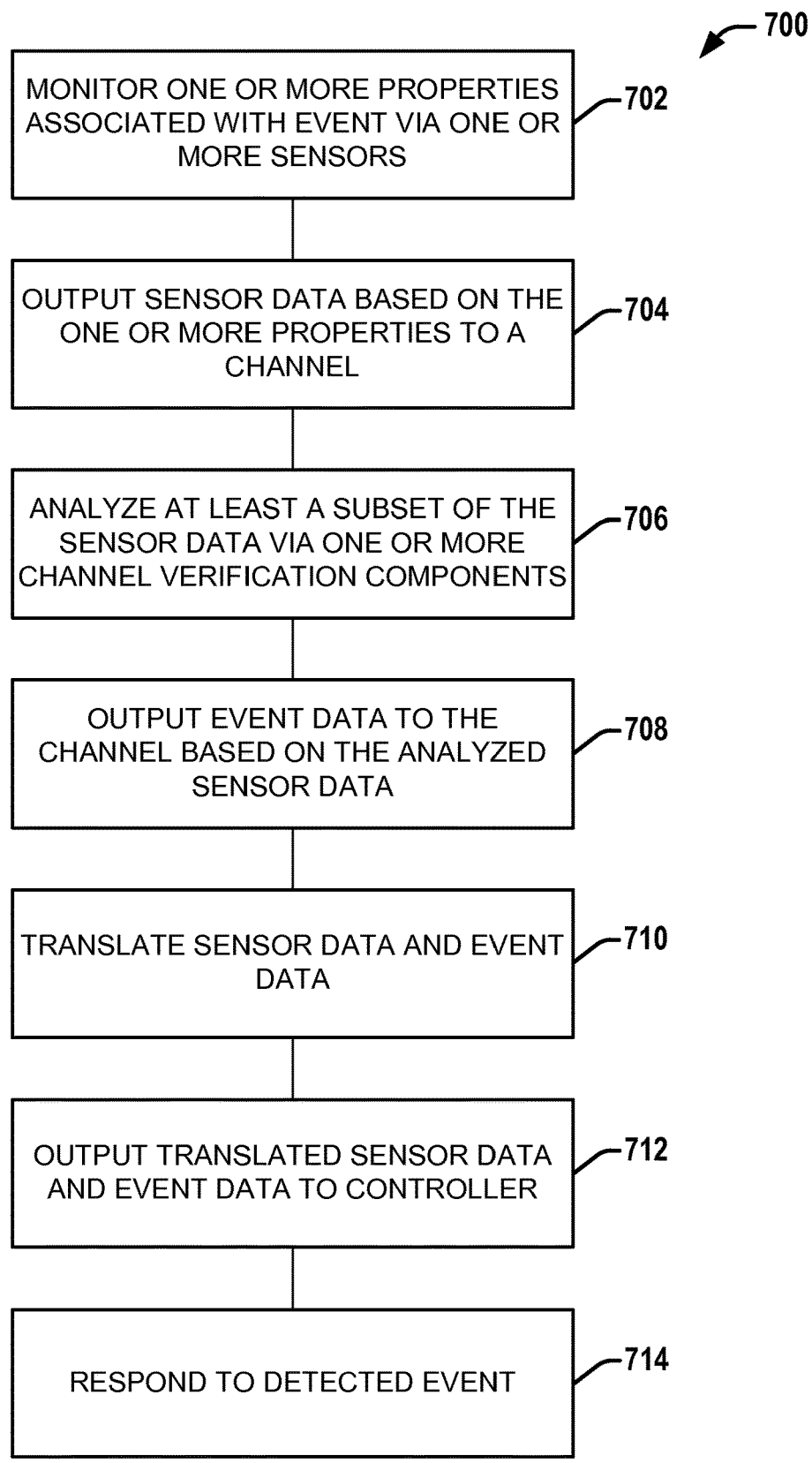
FIG. 7 is a flow diagram illustrating a method that provides for internal event verification in a sensor bus system according to various aspects described herein.

Referring to FIG. 7, illustrated is a flow diagram of a method that provides for internal event verification in a sensor bus unit or system according to various aspects described herein. At 702, one or more properties (e.g., acceleration, etc.) that are associated with an event (e.g., vehicular crash, etc.) can be sensed via one or more sensors. At 704, sensor data based on the one or more properties can be output to a channel (e.g., associated with a sensor bus unit, etc.). At 706, at least a portion of the sensor data can be analyzed via one or more channel verification components (e.g., different channel verification components can analyze different portions of the sensor data, for example, in an embodiment with three channel monitoring sensors, each can monitor sensor data output by the other two). At 708, event data based at least in part on the analyzed sensor data can be output to the channel (e.g., indicating whether the sensor data is associated with an event occurring (e.g., threshold crossed) or not occurring (e.g., threshold not crossed). At 710, the sensor data and event data can be translated (e.g., via a channel master component), and at 712, the translated sensor data and translated event data can be output to a controller, and optionally to an event verification controller. At 714, when the sensor and event data indicates an event (e.g., crash) occurred, the event can be responded to (e.g., sending a signal to initiate airbag deployment).

Figure 8:
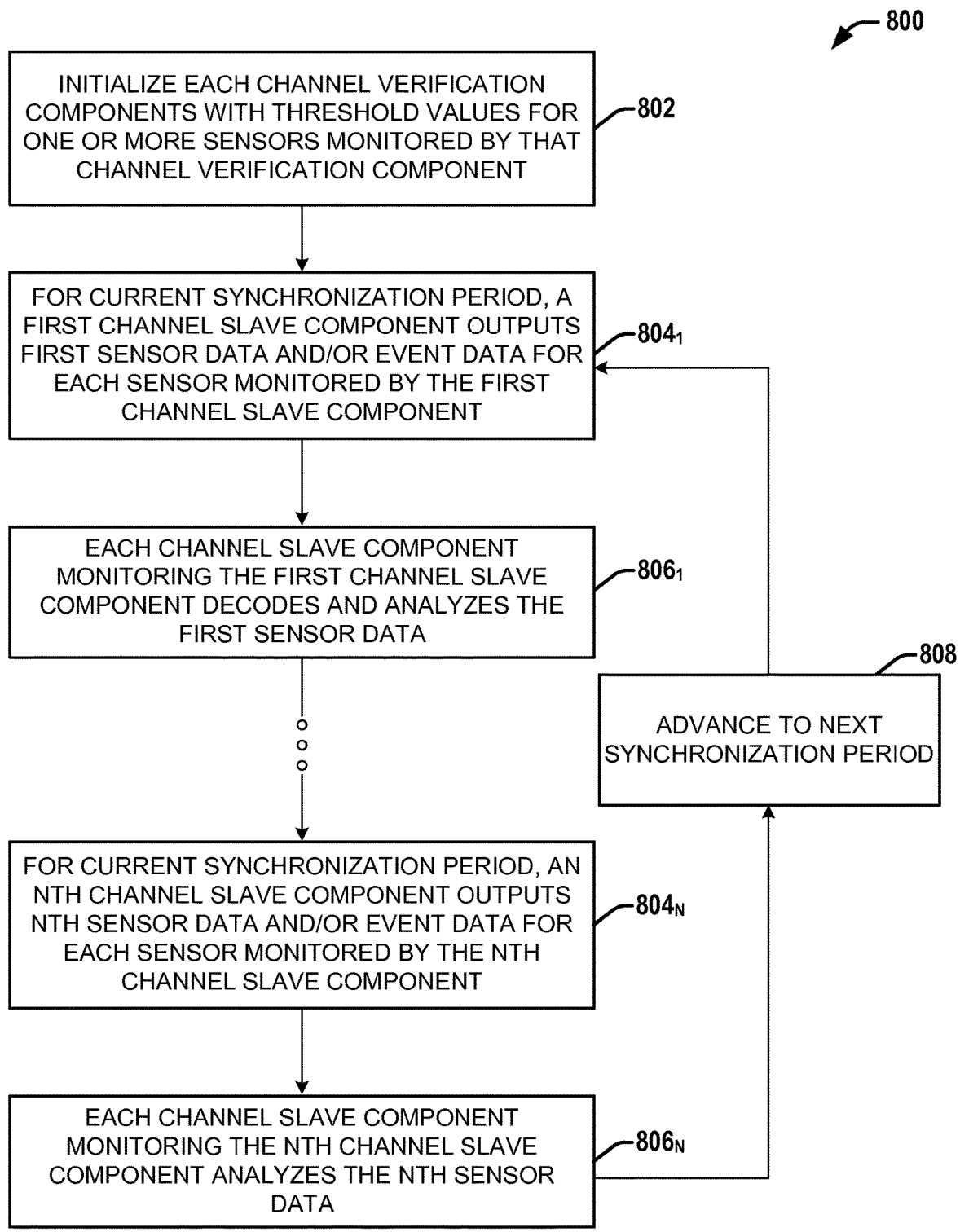
FIG. 8 is a flow diagram illustrating another method that provides for internal event verification in a sensor bus system according to various aspects described herein.

Referring to FIG. 8, illustrated is a flow diagram of another method that provides for internal event verification in a sensor bus unit or system according to various aspects described herein. At 802, each channel slave component that includes a channel verification component (e.g., channel monitoring sensors, self-verifying sensors, channel event monitors, combinations thereof, etc.) can be initialized by a channel master component with threshold values for each of one or more sensors monitored by that channel verification component. The initialization of 802 can occur at startup and/or during runtime (e.g., periodically, based on the occurrence or non-occurrence of one or more conditions (for example, if a change in operating conditions (e.g., temperature, etc.) would affect threshold values, etc.), or in other manners). In an example involving three channel monitoring sensors, the channel master component can configure the first channel monitoring sensor with threshold values for the second and third channel monitoring sensors, can configure the second channel monitoring sensor with threshold values for the first and third channel monitoring sensors, and can configure the third channel monitoring sensor with threshold values for the first and second channel monitoring sensors.

At $804_1$, for a current synchronization period, a first channel slave component outputs first sensor data and/or first event data, depending on whether the first channel slave component includes a sensor (in which case it would output sensor data) and/or a channel verification component (in which case it would output event data associated with each of one or more sensors monitored by the first channel slave component). When both sensor data and event data are output (e.g., a channel monitoring sensor, self-verifying sensor, etc.), the event data can be appended to the sensor data or vice versa. The first event data can include, for each sensor monitored by the first channel slave component, data indicating whether an event occurred based on an analysis of sensor data from that sensor (e.g., data indicating the result of a message integrity check and/or whether a threshold associated with sensor data for that sensor was crossed). This event data can be based on the most recently received sensor data from each of those one or more monitored sensors (e.g., from a current or previous synchronization period), can be based on sensor data received from an earlier synchronization period, or a combination thereof, which can be based at least in part on time required to analyze sensor data. For example, in a sensor bus unit or system with three channel monitoring sensors, the first channel monitoring sensor might output event data based on the most recently received sensor data from the second and third channel monitoring sensors (e.g., output, during synchronization period M, event data associated with sensor data received during synchronization period M−1), from an earlier synchronization period (e.g., output, during synchronization period M, event data associated with sensor data received during synchronization period M−2, such as when the time involved to analyze the sensor data exceeds the available time before the first channel monitoring component next outputs), or from a combination thereof (e.g., output, during synchronization period M, event data associated with sensor data received during synchronization period M−1 from the second channel monitoring sensor and event data associated with sensor data received during synchronization period M−2 from the third channel monitoring sensor, such as when the available time before the first channel monitoring component next outputs allows for analysis of some but not all sensor data).

At $806_1$, each channel slave component monitoring a sensor (when included) of the first channel slave component (e.g., itself if it is a self-verifying sensor, other channel monitoring sensors or channel event verification components on the sensor bus unit or system, etc.) can receive, decode, and analyze the first sensor data. When the first channel slave component does not include a sensor or no channel slave component monitors the first sensor data, $806_1$ can be omitted.

Acts 804 and 806 can occur once for each of the N channel slave components on the sensor bus unit or system. At $804_N$, an Nth channel slave component outputs Nth sensor data (when it comprises a sensor) and/or Nth event data (when it comprises a channel verification component, where the Nth event data includes message integrity and/or threshold data for each sensor monitored by the Nth channel slave component). At $806_N$, each channel slave component monitoring a sensor (when included) of the Nth channel slave component can receive, decode, and analyze the first sensor data.

At 808, method 800 can advance to the next synchronization period, and the method can repeat $804_1$-$806_N$ for the next synchronization period before proceeding again to 808.

In aspects related to self-verifying sensors or embodiments wherein some channel slave components output sensor data before others (e.g., TDD, etc.), event data associated with that sensor data can be output by some channel verification components during the same synchronization period as the sensor data. For example, during synchronization period M in a TDD interface, a third of three channel monitoring sensors could output event data associated with sensor data output by the first and second channel monitoring sensors during synchronization period M. In another example, a self-verifying sensor could output sensor data during synchronization period M along with event data associated with that sensor data during synchronization period M (although in other aspects, event data associated with that sensor data could be output in a later synchronization period, e.g., M+1, such as when additional processing time is needed).

One advantage of including channel verification components in a sensor bus system is that the channel master component receives additional event verification, and, in the case of self-verifying and/or channel monitoring sensors, without additional components. This additional event verification reduces the risk of inadvertent deployment because more independent elements are looking at the data to confirm crash detection.

Another advantage of including channel verification components is that a crash can be detected very early. Usually, the data is passed on SPC (or a similar interface), decoded, then transferred over SPI (or a similar interface) before it is processed, and eventually the crash is detected. However, by including channel verification components, the crash is detected already on the channel interface (e.g., SPC, etc.).

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A sensor bus system comprising:
   one or more channel slave components coupled together, wherein at least one of the one or more channel slave components comprises a sensor configured to sense one or more properties and to output sensor data associated with the one or more sensed properties, and wherein at least one of the one or more channel slave components comprises a channel verification component configured to analyze at least a portion of the sensor data to output sensor integrity data that indicates whether the sensor has an error and to output event data that indicates whether an event occurred other than the error to the sensor, based at least in part on the analysis; and
   a channel master component coupled to the one or more channel slave components, wherein the channel master component is configured to receive the sensor data and the event data encoded according to a first communication protocol and is configured to output the sensor data and the event data encoded, confirming whether the event occurred, according to a second communication protocol to a controller, wherein the first communication protocol is different from the second communication protocol.

2. The sensor bus system of claim 1, wherein a first channel slave component of the one or more channel slave components comprises a first sensor configured to sense the one or more properties and to output first sensor data associated with the one or more sensed properties, and wherein the first channel slave component further comprises a first channel verification component that is configured to analyze at least a first portion of the sensor data and to output first event data based at least in part on the analysis.

3. The sensor bus system of claim 2, wherein the first channel slave component is a channel monitoring sensor, wherein the first channel verification component is configured to analyze sensor data output by at least one sensor other than the first sensor.

4. The sensor bus system of claim 1, wherein one of the at least one channel slave components that comprises a channel verification component comprises a channel event verifier that analyzes sensor data output by one or more other channel slave components.

5. The sensor bus system of claim 1, wherein the channel master component is further configured to output the information associated with the sensor data to an event verification controller.

6. The sensor bus system of claim 1, wherein the one or more channel slave components are configured to transmit and to receive via a common communication mode.

7. The sensor bus system of claim 1, wherein the one or more channel slave components are configured to transmit via a first communication mode and to receive via a second communication mode, wherein the first communication mode is distinct from the second communication mode.

8. The sensor bus system of claim 1, wherein at least one of the channel verification components comprises one or more of a high pass filter or a low pass filter.

9. The sensor bus system of claim 1, wherein the one or more sensed properties comprise at least one of a pressure or an acceleration.

10. A device, comprising:
    a communication component configured to be coupled to a sensor bus, wherein the communication component is configured to receive first sensor data associated with one or more first properties;
    a sensor configured to sense one or more second properties and to generate second sensor data associated with the one or more second properties; and
    a channel verification component configured to analyze at least a portion of the first sensor data, to analyze at least a portion of the second sensor data, to generate sensor integrity data that indicates whether the sensor has an error, and to generate event data that indicates whether an event occurred other than the error to the sensor, wherein the event data is based at least in part on the analyzed first sensor data and the analyzed second sensor data, and wherein the communication component is further configured to transmit the event data on a channel associated with the sensor bus for further verification of the event data.

11. The device of claim 10, wherein the communication component is configured to transmit the second sensor data on the channel associated with the sensor bus.

12. The device of claim 11, wherein the first sensor data is distinct from the second sensor data, and wherein the communication component is configured to receive the first sensor data from the channel associated with the sensor bus.

13. The device of claim 11, wherein the communication component is configured to transmit the event data appended to the second sensor data.

14. The device of claim 10, wherein the first sensor data comprises the second sensor data.

15. The device of claim 10, wherein the channel verification component is configured to analyze at least the portion of the first sensor data based at least in part on a comparison to one or more threshold values.

16. The device of claim 10, wherein the communication component is configured to transmit and to receive via a common communication mode.

17. The device of claim 10, wherein the communication component is configured to transmit via a first communication mode and to receive via a second communication mode, wherein the first communication mode is distinct from the second communication mode.

18. The device of claim 10, wherein at least one of the communication component or the channel verification component comprises one or more of a high pass filter or a low pass filter that filters the first sensor data.

19. A method comprising:
sensing, using one or more sensors, one or more properties associated with an event;
outputting sensor data associated with the one or more sensed properties to a channel associated with a sensor bus, wherein the sensor data is encoded according to a first communication protocol;
analyzing at least a portion of the sensor data;
outputting sensor integrity data, indicating whether the one or more sensors have an error, and event data, indicating whether the event occurred other than the error to the one or more sensors, based at least in part on the analyzed portion of the sensor data to the channel associated with the sensor bus, wherein the event data is encoded according to the first communication protocol;
encoding the sensor data and the event data according to a second communication protocol, wherein the second communication protocol is different from the first communication protocol;
verifying the event based on the sensor data outputted to the channel associated with the sensor bus and the event data outputted to the channel associated with the sensor bus; and
sending a signal, upon verification of the event, for deployment of safety equipment associated with the event.

20. The method of claim 19, wherein the safety equipment comprises at least an airbag.

* * * * *